United States Patent
Streich

(10) Patent No.: US 6,464,552 B1
(45) Date of Patent: Oct. 15, 2002

(54) MODEL HELICOPTER

(76) Inventor: Uli Streich, Seewiese 7, 97782 Gräfendorf (DE)

( * ) Notice: Subject to any disclaimer, the term of this patent is extended or adjusted under 35 U.S.C. 154(b) by 0 days.

(21) Appl. No.: 09/744,785

(22) PCT Filed: Jul. 21, 1999

(86) PCT No.: PCT/DE99/02283

§ 371 (c)(1),
(2), (4) Date: Jan. 30, 2001

(87) PCT Pub. No.: WO00/07683

PCT Pub. Date: Feb. 17, 2000

(30) Foreign Application Priority Data

Aug. 5, 1998 (DE) .......................................... 198 35 385

(51) Int. Cl.$^7$ ............................................. A63H 27/133
(52) U.S. Cl. ..................... 446/36; 123/41.65; 244/12.2; 244/17.11
(58) Field of Search ............................... 446/34, 35, 36, 446/37, 38, 39, 40, 41, 42, 43, 44, 45, 48; 123/41.65; 244/12.2, 17.11

(56) References Cited

U.S. PATENT DOCUMENTS 2,419,604 A * 4/1947 Stanley ..................... 123/41.65
5,149,014 A * 9/1992 Faller ....................... 244/17.11
6,270,038 B1 * 8/2001 Cycon et al. .............. 244/12.2

* cited by examiner

*Primary Examiner*—Derris H. Banks
*Assistant Examiner*—Dmitry Suhol
(74) *Attorney, Agent, or Firm*—Edwin D. Schindler

(57) ABSTRACT

A model helicopter includes a body and an engine mounted in the body. A rotor is connected to the engine through a substantially vertical primary shaft. A radial fan cools the engine while a lateral opening is provided on a tail boom connected to the body. Air is sucked in from outside of the body by a radial fan in the body, with the air flowing through the lateral opening and being directed to the tail boom through a channel. This air imparts a torque on the body that counter-acts the torque transmitted by the drive for the rotor on the body. The radial fan includes two impellers, which are coaxially mounted on the primary shaft. The air displaced by the second impeller flows through the engine, while flowing through the body, and dissipating the heat from the engine. A separation wall is provided between the two impellers of the radial fan.

12 Claims, 2 Drawing Sheets

MODEL HELICOPTER

BACKGROUND OF THE INVENTION

1. Technical Field of the Invention

Figure 1:
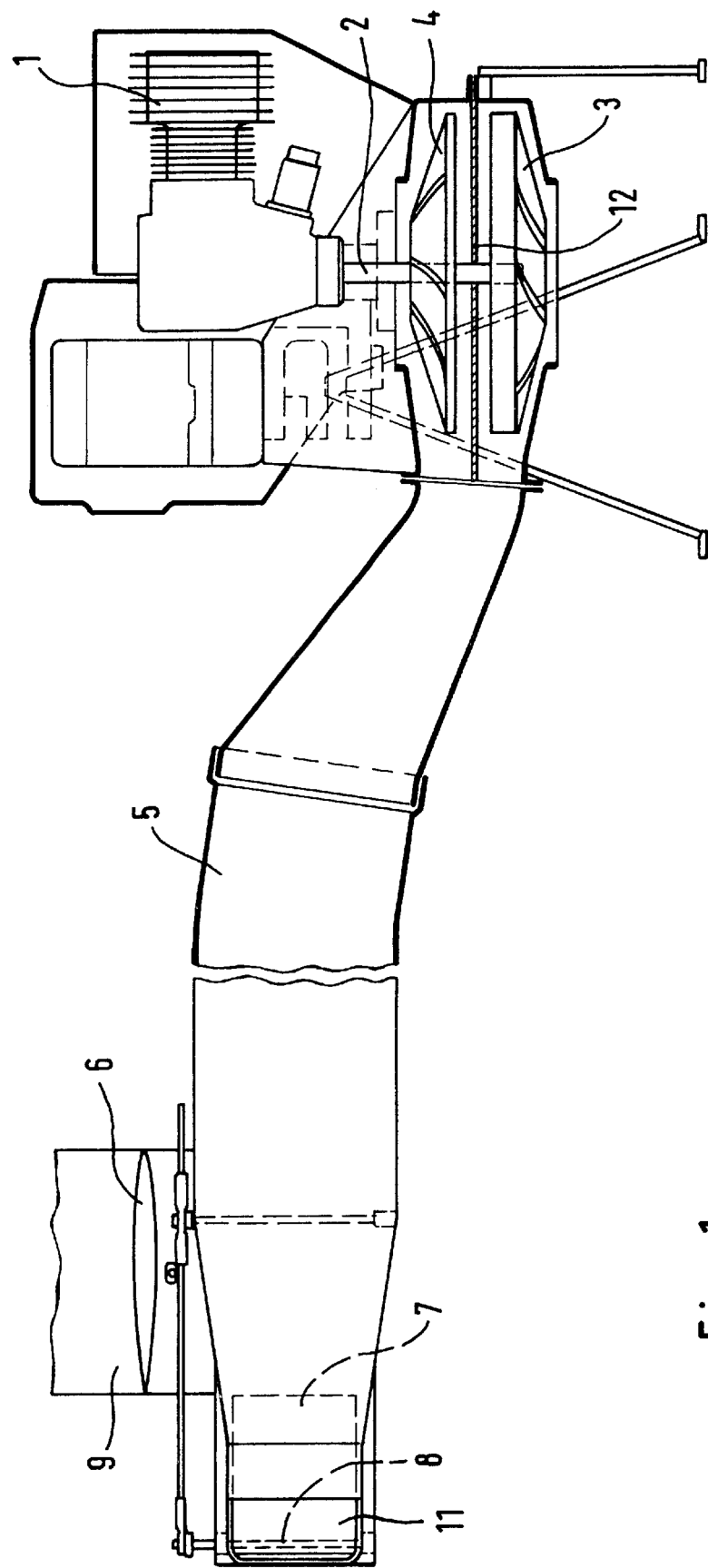

The invention relates to a model helicopter that comprises a body as well as an engine mounted therein to which a rotor is connected through an essentially vertical primary shaft. A lateral outlet opening is provided on the tail boom connected to the body The air sucked from the outside by a radial fan in the body flows through said opening and is directed to the tail boom through a channel. This air imparts a torque on the body that counteracts the torque transmitted by the rotor drive on said body. The air displaced by a first impeller of the fan flows through the engine while flowing through the body and dissipates the heat from said engine.

2. Description of the Prior Art

With most model helicopters, just lie the original helicopters, the drive of the rotor imparts a torque on the body which is compensated by a tail rotor located on the boom As an alternative, some types of helicopter have an outlet opening at the tail from which flows air sucked in the body from outside. In the tail boom the air is subject to a change of impetus perpendicularly in relation to the direction of flight and transmits a force to the tail booms which results in a torque that counteracts the torque caused by the rotor drive as disclosed in U.S. Pat. No. 2,419,604). This principle of compensating for the torque is also used for model helicopters, especially copies of the corresponding original helicopters. In the case of such model helicopters it is known to suck the air into the body via a fan in an axial direction from outside and to expel it in a radial direction where it is directed through a channel into the tail boom and there is subject to the described deflection before escaping through the outlet opening. The lateral control is effected in that the outlet opting is more or less supplied with air with the aid of a flow control device in dependency upon the desired flight path In order to cool the engine a further fan is provided, which works independently. The disadvantage with such types of model helicopters is that the two fans that function independently from each other together have large constructive demands.

SUMMARY OF THE INVENTION

By way of contrast, the invention has the object of creating a model helicopter of the generic concept described at the outset where the constructive demands required in total for torque compensation and cooling the engine are minimized.

In accordance with the invention, this task is solved therein that the radial fan comprises two impellers which are mounted coaxially on the same shaft and a separation wall is provided between the two impellers.

The basic idea of the invention is to utilize the air sucked from the outside by the fan in the body to control and also to cool the engine. Thus solely one fan is required. Because the engine presents a relatively high flow resistance to air flowing through for cooling purposes, and by virtue of the fact that for cooling not the entire amount of the air sucked in is required, it is intended to allow solely part of the air sucked in to flow through the engine compartment. Therefore, two impellers are provided and solely the quantity of air conveyed by the first impeller is to flow through the engine compartment Owing to the coaxial arrangement on the same primary shaft, the constructive demands required to that end are minimized. The separation wall arranged between the two impellers facilitates a defied division of the quantity of air sucked in, without thereby generating an unnecessary high flow resistance The size of the second impeller compared with the first determines the quantity of air supplied to the engine for cooling purposes. Depending on the constructive conditions, the air can be supplied by the fit impeller via the engine or the air may not reach the engine in the flow direction until behind the impeller.

The quantity of air conveyed by the first impeller is heated by the engine and therefore has a higher temperature when combined with the air conveyed by the other impeller, which, owing to the resulting difference in density in the channel disposed between the body and the tail boom, can cause undesirable turbulence in the flow. As a remedy it is proposed the dispose the fist impeller perpendicularly above the second so that when the two air flows are combined the air heated by the engine is located above the cooler air and thus in the channel a stable stratification prevails, thus largely eliminating the expectation of turbulence caused by an ascending force.

In a preferred embodiment of the invention, the two impellers are disposed on the engine shaft This eliminates the power loss caused by gearing As known in the state of the art, the inventive model helicopter can be controlled in respect of its banking position through different degrees of throttling of the quantity of air driven through the fan. Owing to the increase in flow resistance, however, an unnecessarily high fan performance is needed, which, moreover, depending on the foreseen flight path, varies, which can result in a volatility of the residual performance for driving the rotor As a remedy, it is proposed to provide a smaller second outlet opening opposite the first outlet opening, which discharges a smaller quantity of air and imparts a torque through deflection that counteracts the torque caused by the first outlet opening. The torque resulting from the air discharged on the tail side is controlled by means of a controlling system which distributes the total quantity of air conveyed through the fan, in an adjustable ratio, to the two outlet openings Thus the fall is exposed to a consistently low flow resistance. The first outlet opening is larger than the second and it is supplied with more air because the torque caused by the air outlet on the tail side must filly compensate the torque imparted by the rotor drive.

In a preferred embodiment of the invention the controlling system describes, in a position corresponding to level flight, a plane extending essentially in the lengthwise direction of the body. It thus extends in the direction of the flow and thus only causes a slight air resistance By means of the perpendicular orientation, a lateral separation is possible for distribution to the lateral outlet openings in an especially simple means of flow guidance Moreover, the heating of the air by the engine may possibly result in a vertical temperature gradient, and thus also a density gradient, so that if the controlling system does not stand vertically the average air temperature at the outlet openings can differ, which may have undesired effects on the control behavior.

As far as possible, the adjustable controlling system should not be impacted, at least when the helicopter is in level flight. The surfaces on which the flow is redirected to the lateral outlet openings and which are thus impacted by the force causing the torque, should for this reason as far as possible be disposed so as to remain behind the controlling system. The deflection of the flow works most effectively if the controlling system fits seamlessly and for this purpose is configured at the tail end as a swivelling mounted flap which, independent of its position, can fit seamlessly with the deflection walls. To bank the helicopter, the flap is tilted about the rotation axis and thus effects a change of the distribution of the quantities of air between the outlet openings. An inflow that undesirably subjects the flap to a force, however, cannot be avoided.

To support banking, rudders can also be used and controlled in conjunction with the controlling system.

A further improvement in the banking properties can be achieved by using an elevator unit and by controlling it together with the controlling system.

The impulse expelled per time unit through a lateral outlet opening, and thus the force acting upon the tail boom, can be increased while the same quantity of air flows through if the outlet opening is configured as a nozzle. This is possible if solely a single or two opposing outlet openings exist, one of which is preferably configured as a nozzle, although both may be.

BRIEF DESCRIPTION OF THE DRAWING FIGURE

Further details, features and advantages of die invention can be taken from the following description part in which with the aid of drawings a typical embodiment of the invention is explained in greater detail. They show in a schematic diagram.

FIG. 1 an overview of the fan and

Figure 2:
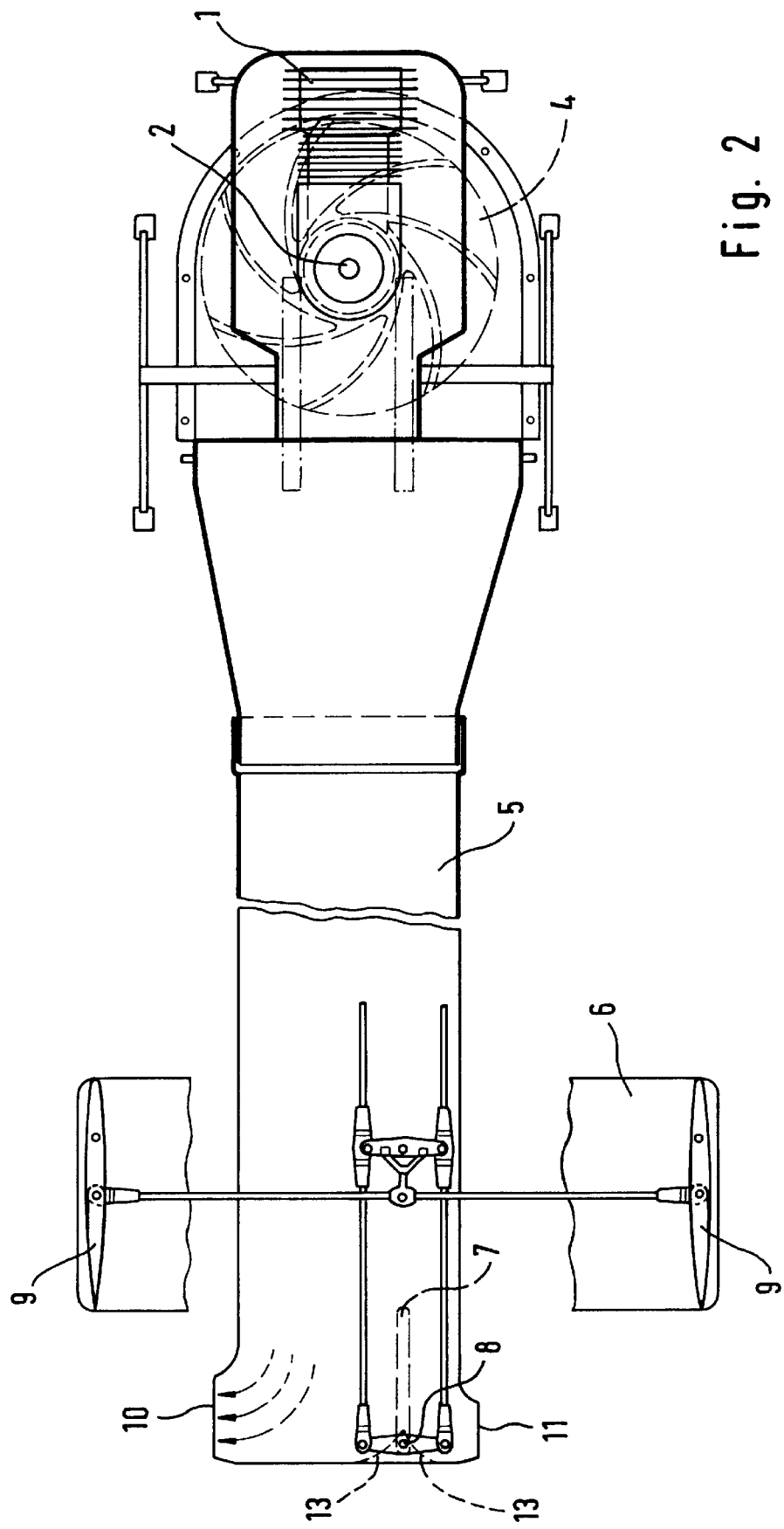

FIG. 2 the air outlet on the tail side.

DETAILED DESCRIPTION OF THE DRAWING AND PREFERRED EMBODIMENTS

FIG. 1 shows parts of the inventive helicopter in a lateral, partially sectioned representation The fan comprises a lower, first impeller (3) and an upper, second impeller (4) between which a separation wall (12) is disposed. The first impeller (3) sucks in air from below and guides it in a radial direction to a channel (5), which is configured between the body of the helicopter and the tail boom. The second impeller (4) sucks in air approximately from above through the compartment of the engine (1), where it is heated, and supplies it to the channel (5) above the cooler air conveyed by the other impeller, so that owing to the direction of the temperature gradient a stable stratification is achieved. Both impellers are mounted coaxially on the same shaft (2), which in this case is the engine shaft. To aid the control of the helicopter, an elevator unit (6) is disposed on the tail side.

FIG. 2 shows the same model helicopter in a partially sectioned representation in a top plan view. Recognizable is here again the engine (1) and the second impeller (4) as well as the common shaft (2) of the impellers. Owing to the rotation of the second impeller (4), air is sucked in from above through the engine (1) and is guided radially into the channel which extends between the body and the tail boom. Through a larger lateral outlet opening (10) and a second smaller outlet opening (11) opposite it, there escapes respectively one part of the quantity of air sucked in. Thereby, respectively one of the force components opposing the lateral acceleration of the air required for expelling through the outlet openings is transmitted on the tail boom and causes a torque that acts on the body connected to the tail boom. The torque imparted by the first outlet opening (10) is thereby larger than the torque caused by the second lateral outlet opening (11) and opposes the torque imparted on the body by the rotor drive so that in level flight the torques acting upon the body are cancelled out. Via a controlling system, in tis case, configured as a flap (7), the air is divided between the outlet openings (10, 11). In the direction of the flow, behind the flap (7), deflection surfaces (13) are disposed by means of which the air flow is redirected laterally in the direction of the outlet openings (10, 11) and which are subject to the force imparted by the torque At their rear end, the flap (7) is affixed to the deflection surfaces (13) which thus fulfil their function independent of the flap position When the helicopter is in level flight, the flap extends lengthwise and virtually no forces generated by the flow impact it, whereas after being swivelled about its axis (8) to control the helicopter, the flap (7) is subject to an airflow on one side so that to stabilize it a retaining power is required. Owing to the vertical arrangement, the flap (7) supplies the two outlet openings (10 and 11) from all temperature layers of the channel (5) and thus guarantees an approximately uniform outlet temperature. On both sides of the tail boom, respectively one rudder (9) is disposed which is controlled together with the flap (7) and thus improves the banking properties. In addition, the elevation unit (6) represented in FIG. 1 is adjusted when the helicopter is controlled laterally.

In an overall view, one obtains a model helicopter where the torque transmitted by the rotor drive is compensated by at least one lateral air outlet opening and where the air conduction to the lateral outlet opening, in a simple construction, with relatively little flow resistance, is additionally used to cool the engine.

What is claimed is:

1. A model helicopter, comprising:
    a body;
    a rotor having a substantially vertical shaft connected thereto;
    a rotor drive for driving said rotor;
    an engine mounted within said body and connected to said rotor;
    a tail boom connected to said body, said tail boom having a lateral opening; and,
    a radial fan within said body for sucking air from outside said body to inside said body for cooling said engine, with said air flowing through said lateral opening and being directed to said tail boom through a channel, said air imparting a first torque on said body that counteracts a second torque transmitted by said rotor drive on said body, said radial fan comprising a first impeller and a second impeller with a separation wall being positioned between said first impeller and said second impeller, with both said first impeller and said second impeller being coaxially mounted on said substantially vertical shaft of said rotor, with said air displaced by id first impeller of said radial fan flowing through said engine, thereby dissipating heat from said engine.

2. The model helicopter according to claim 1, wherein said air displaced by said first impeller of said radial fan flows through said engine in a direction of flow in front of said first impeller.

3. The model helicopter according to claim 1, wherein said air displaced by said first impeller of said radial fan flows through said engine in a direction of flow behind said first impeller.

4. The model helicopter according to claim 1, wherein said first impeller is disposed in a vertical direction above said second impeller.

5. The model helicopter according to claim 1, wherein said substantially vertical shaft of said rotor, on which said first impeller and said second impeller are mounted, is a primary shaft for said engine.

6. The model helicopter according to claim 1, wherein said tail boom includes an additional lateral opening opposite said lateral opening, with said additional lateral opening being smaller than said lateral opening, further comprising means for adjustably controlling air sucked into said lateral opening and said additional lateral opening, said means for adjustably controlling air supplying more air to said lateral opening than said additional lateral opening.

7. The model helicopter according to claim 6, wherein said means for adjustably controlling air defines a plane that extends vertically and substantially in a lengthwise direction of said body.

8. The model helicopter according to claim 6, wherein said means for adjustably controlling air is a flap that is swivel mounted at its tail end.

9. The model helicopter according to claim 6, further comprising rudders which are controlled together with said means for adjustably controlling air.

10. The model helicopter according to claim 9, further comprising an elevator unit which is controlled together with said means for adjustably controlling air.

11. The model helicopter according to claim 6, wherein said additional lateral opening is configured as a nozzle.

12. The model helicopter according to claim 1, wherein said lateral opening is configured as a nozzle.

* * * * *